(12) United States Patent
Itaya et al.

(10) Patent No.: US 10,302,773 B2
(45) Date of Patent: May 28, 2019

(54) RADIATION DETECTOR

(71) Applicant: KONICA MINOLTA, INC., Chiyoda-ku, Tokyo (JP)

(72) Inventors: Keiko Itaya, Hino (JP); Takafumi Yanagita, Hachioji (JP); Kazuhiro Maeda, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/844,241

(22) Filed: Dec. 15, 2017

(65) Prior Publication Data

US 2018/0275287 A1 Sep. 27, 2018

(30) Foreign Application Priority Data

Mar. 21, 2017 (JP) .................... 2017-054707

(51) Int. Cl.
| | |
|---|---|
| *G01T 1/29* | (2006.01) |
| *G01T 1/20* | (2006.01) |
| *G01T 1/202* | (2006.01) |
| *G21K 4/00* | (2006.01) |

(52) U.S. Cl.
CPC ............ *G01T 1/2006* (2013.01); *G01T 1/201* (2013.01); *G01T 1/202* (2013.01); *G01T 1/2018* (2013.01); *G21K 2004/04* (2013.01); *G21K 2004/08* (2013.01); *G21K 2004/10* (2013.01); *G21K 2004/12* (2013.01)

(58) Field of Classification Search
CPC ......... G01T 1/202; G01T 1/2018; G01T 1/20; G01T 1/2006; G01T 1/201; G21K 2004/04; G21K 2004/08; G21K 2004/10; G21K 2004/12
See application file for complete search history.

(56) References Cited

U.S. PATENT DOCUMENTS

| | | | | |
|---|---|---|---|---|
| 9,575,187 | B2 | 2/2017 | Arimoto et al. | |
| 2008/0302970 | A1* | 12/2008 | Fujieda ................. | G01T 1/2018 250/370.11 |
| 2010/0072379 | A1* | 3/2010 | Nishino ................ | G01T 1/2018 250/363.08 |
| 2012/0009375 | A1* | 1/2012 | Sakai ...................... | G01T 1/20 428/68 |
| 2013/0284935 | A1* | 10/2013 | Kaneko .................. | G01T 1/202 250/361 R |

FOREIGN PATENT DOCUMENTS

| | | | |
|---|---|---|---|
| EP | 2672292 B1 | * | 2/2018 |
| JP | 2013126730 A | | 6/2013 |
| JP | 2015230175 A | | 12/2015 |

* cited by examiner

*Primary Examiner* — Kiho Kim
(74) *Attorney, Agent, or Firm* — Holtz, Holtz & Volek PC

(57) ABSTRACT

A radiation detector includes: a scintillator panel having a scintillator layer; and a photoelectric conversion panel having a support substrate, a light receiving element, and a switching element, wherein the light receiving element faces the scintillator layer, the photoelectric conversion panel has flexibility, and the scintillator layer is formed by being sealed with a moisture-proof material.

6 Claims, 9 Drawing Sheets

FIG. 11

| | GLASS TFT SENSOR | FLEXIBLE TFT SENSOR 1 | FLEXIBLE TFT SENSOR 2 | PROCESS DESCRIPTION |
|---|---|---|---|---|
| BASE SUBSTRATE | GLASS | GLASS | GLASS | |
| FILM FORMATION | — | FILM / GLASS | FILM / GLASS | · APPLY FILM MATERIAL TO GLASS SURFACE |
| MOISTURE-PROOF LAYER FORMATION | | | MOISTURE-PROOF LAYER / FILM / GLASS | · FORM MOISTURE-PROOF LAYER ON FILM |
| SEMICONDUCTOR ELEMENT FORMATION | PANEL COMPLETION: TFT ELEMENT/PD ELEMENT / GLASS | TFT ELEMENT/PD ELEMENT / FILM / GLASS | TFT ELEMENT/PD ELEMENT / MOISTURE-PROOF LAYER / FILM / GLASS | · FORM TFT<br>· FORM PHOTODIODE |
| FILM PEELING-OFF | — | TFT ELEMENT/PD ELEMENT / FILM | TFT ELEMENT/PD ELEMENT / MOISTURE-PROOF LAYER / FILM | · LIFT OFF FILM FROM GLASS SUBSTRATE BY LASER |
| SUPPORT SUBSTRATE PASTING | — | PANEL COMPLETION: TFT ELEMENT/PD ELEMENT / FILM / SUPPORT SUBSTRATE | TFT ELEMENT/PD ELEMENT / MOISTURE-PROOF LAYER / FILM / SUPPORT SUBSTRATE | · PASTE SUPPORT SUBSTRATE AS NECESSARY |

RADIATION DETECTOR

The entire disclosure of Japanese patent Application No. 2017-054707, filed on Mar. 21, 2017, is incorporated herein by reference in its entirety.

BACKGROUND

Technological Field

The present invention relates to a radiation detector in which moisture resistance of a scintillator is improved when a photoelectric conversion panel of a flexible resin substrate is used.

Description of the Related Art

In recent years, digital system radiation image detectors, represented by computed radiography (CR), flat panel detectors (FPDs), and the like, have been widely used for image diagnosis in hospitals, clinics, and the like since the digital system radiation image detectors enable digital radiation images to be directly obtained and images to be directly displayed on image display devices such as a cathode tube and a liquid crystal panel. Recently, attention has been focused on flat panels using a scintillator layer containing cesium iodide (CsI) and assembled with a thin film transistor (TFT), as a high-sensitive X-ray image visualization system.

In the FPD, a light receiving element and a switching element are provided on a glass substrate in many cases, and the glass substrate serves to protect the scintillator to be coupled from moisture from the light receiving element side. Further, also from the viewpoint of protection from moisture and the viewpoint that thermal expansion of a member caused by environmental temperature fluctuation is suppressed to prevent warpage or peeling-off, a substrate made of glass is also used in a lateral side, which faces a photoelectric conversion panel, of the scintillator in many cases.

In recent years, in order to achieve flexibility and weight reduction, a photoelectric conversion panel is considered to be employed in which a resin substrate is used instead of a glass substrate and a switching element and a light receiving element are provided on the resin substrate. Techniques of changing a base material from glass to a resin, a composite material, or the like (for example, JP 2015-230175 A and JP 2013-126730 A) have also been proposed, and there is an increasing demand for changing a photoelectric conversion panel to a resin substrate in a radiation detector that acquires a medical image.

In the case of using a resin substrate, humidity, which is blocked in the case of a conventional glass substrate, is transmitted through the resin substrate so that deterioration of the scintillator due to humidity and corrosion of wiring and the like may occur. Further, problems are also considered in that fastness is degraded by the resin substrate and the detector itself is deteriorated or is damaged due to scratches of the surface.

Further, in accordance with achieving flexibility and weight reduction, impact during use or deviation in load may be generated. In a radiation image detector, various unevennesses or defects of a photoelectric conversion element array and a radiation image conversion panel are corrected before photographing so as to uniformize signals. However, although there is unevenness caused by accumulation of static electricity in the inside of the detector in the market environment, positional information of correction is deviated by deviation due to thermal fluctuation or impact so that original unevenness or defects are regarded to be more intensified. As a result, unevenness or defects are generated on the image, which may result in troubles in diagnosis.

SUMMARY

Under such circumstances, the inventors of the present invention conducted intensive studies to improve moisture resistance of a scintillator when a flexible photoelectric conversion panel is used. As a result, the inventors found that any of the above problems can be solved by sealing a scintillator layer with a moisture-proof material, thus completing the present invention. The configuration of the present invention is as follows.

To achieve the abovementioned object, according to an aspect of the present invention, a radiation detector reflecting one aspect of the present invention comprises:
scintillator panel having a scintillator layer; and
a photoelectric conversion panel having a support substrate, a light receiving element, and a switching element, wherein
the light receiving element faces the scintillator layer,
the photoelectric conversion panel has flexibility, and
the scintillator layer is formed by being sealed with a moisture-proof material.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 11 illustrates production processes of the flexible TFT.

DETAILED DESCRIPTION OF EMBODIMENTS

Figure 1:
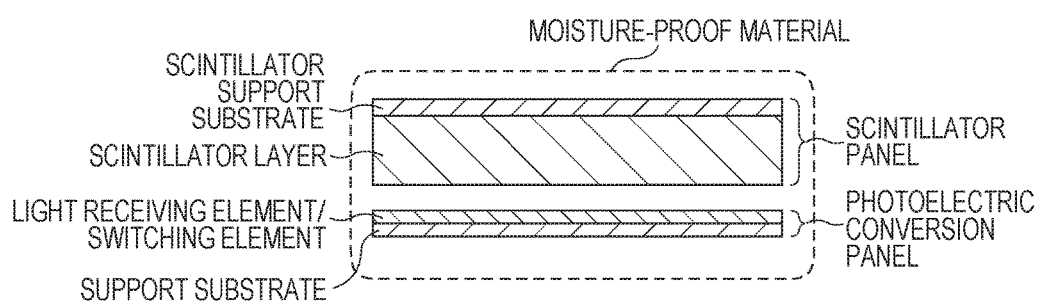
FIG. 1 is a schematic cross-sectional view illustrating a radiation detector according to an embodiment of the present invention.

Hereinafter, one or more embodiments of the present invention will be described with reference to the drawings. However, the scope of the invention is not limited to the disclosed embodiments.

A radiation detector of the present invention includes a scintillator panel having a scintillator layer and a photoelectric conversion panel having flexibility.

Such constituent members of the present invention will be described below.

Scintillator Panel

The scintillator layer contains a phosphor. A phosphor layer serves to convert energy of an X ray that is a radiation, which is incident from the outside, into visible light.

The phosphor in the present invention refers to a phosphor that emits light by exciting an atom when irradiated with ionizing radiations such as α rays, γ rays, and X rays. That is, it is a phosphor that converts a radiation into ultraviolet or visible light and emits the ultraviolet or visible light. The phosphor is not particularly limited as long as it is a material that can efficiently convert energy of a radiation, such as X rays, which is incident from the outside, into light. Further, conversion of the radiation into light is not necessarily performed instantaneously, but a scheme may be used in which the radiation is accumulated once as a latent image in the phosphor layer and the latent image is read later.

For example, as the phosphor according to the invention, a substance that can convert a radiation such as X rays into light having a different wavelength such as visible light can be appropriately used. Specifically, scintillators and phosphors described in Pages 284 to 299 of "Phosphor Handbook" (edited by Phosphor Study Society, published by Ohm Corporation, 1987), substances described in Web homepage "Scintillation Properties (http://scintillator.lbl.gov/)" of U.S. Lawrence Berkeley National Laboratory, and the like are considered, but even substances not described herein can also be used as phosphor particles as long as they are "substances that can convert a radiation such as X rays into light having a different wavelength such as visible light."

Specific examples of a composition of the phosphor include the following.

First, examples thereof include a metal halide phosphor represented by Basic Composition Formula (I):

$$M^I X \cdot a M^{II} X'_2 \cdot b M^{III} X''_3 : zA.$$

In the above formula, $M^I$ represents an element that may become a monovalent cation, that is, represents at least one selected from the group consisting of lithium (Li), sodium (Na), potassium (K), rubidium (Rb), cesium (Cs), thallium (Tl), silver (Ag), and the like.

$M^{II}$ represents an element that may become a divalent cation, that is, at least one selected from the group consisting of beryllium (Be), magnesium (Mg), calcium (Ca), strontium (Sr), barium (Ba), nickel (Ni), copper (Cu), zinc (Zn), cadmium (Cd), and the like.

$M^{III}$ represents at least one selected from the group consisting of scandium (Se), yttrium (Y), aluminum (Al), gallium (Ga), indium (In), and elements belonging to lanthanoid.

X, X', and X" each represent a halogen element, and may represent different elements or the same element.

A represents at least one selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a, b, and z each independently represent numerical values within ranges of $0 \leq a < 0.5$, $0 \leq b < 0.5$, and $0 < z < 1.0$.

Further, examples of the composition of the phosphor include a rare earth activated metal fluorohalide phosphor represented by Basic Composition Formula (II):

$$M^{II}FX:zLn.$$

In the above formula, $M^{II}$ represents at least one alkaline earth metal element, Ln represents at least one element belonging to lanthanoid, and X represents at least one halogen element. Further, z represents a value within a range of $0 < z \leq 0.2$.

Further, examples of the composition of the phosphor include a rare earth oxysulfide phosphor represented by Basic Composition Formula (III):

$$Ln_2O_2S:zA.$$

In the above formula, Ln represents at least one element belonging to lanthanoid, A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). Further, z represents a value within a range of $0 < z < 1$.

Particularly, $Gd_2O_2S$ using gadolinium (Gd) as Ln is preferable because it is known that by using terbium (Tb), dysprosium (Dy), or the like as an element of A, $Gd_2O_2S$ exhibits high luminous characteristics in a wavelength region in which a light receiving element receives light most easily.

Further, examples of the composition of the phosphor include a metal sulfide phosphor represented by Basic Composition Formula (IV):

$$M^{II}S:zA.$$

In the above formula, $M^{II}$ represents an element that may become a divalent cation, that is, at least one element selected from the group consisting of an alkaline earth metal, Zn (zinc), Sr (strontium), Ga (gallium), and the like, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). Further, z represents a value within a range of $0 < z < 1$.

Further, examples of the composition of the phosphor include a metal oxoate phosphor represented by Basic Composition Formula (V):

$$M_a(AG)_b:zA.$$

In the above formula, M represents a metal element that may become a cation, (AG) represents at least one oxo acid group selected from the group consisting of a phosphate, a borate, a silicate, a sulfate, a tungstate, and an aluminate, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

Further, a and b represent any value that may be obtained according to a valance of a metal or an oxo acid group. z represents a value within a range of $0 < z < 1$.

Further, examples of the composition of the phosphor include a metal oxide phosphor represented by Basic Composition Formula (VI):

$$M_aO_b:zA.$$

In the above formula, M represents a metal element that may become a cation, and represents at least one element selected from examples of any of $M^I$ to $M^{II}$ described above.

Further, a and b represent any value that may be according to a valance of a metal or an oxo acid group. z represents a value within a range of $0 < z < 1$.

Further, examples of the composition of the phosphor include a metal acid halide phosphor represented by Basic Composition Formula (VII):

$$LnOX:zA.$$

In the above formula, Ln represents at least one element belonging to lanthanoid, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). Further, z represents a value within a range of 0<z<1.

In the present invention, the scintillator layer is typically formed from a phosphor matrix compound and an activator agent. Further, the scintillator layer may be configured by a phosphor columnar crystal formed by a vapor deposition method or may be a layer obtained by applying a phosphor particle dispersion liquid and depositing particles.

As the vapor deposition method, a heating vapor deposition method, a sputtering method, a CVD method, an ion plating method, and other methods can be used, but a heating vapor deposition method is particularly desirable.

In the case of using a particle dispersion liquid, a polymer binder (hereinafter, also referred to as a "binder") may be contained, and specific examples of the polymer binder include polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (such as nitrocellulose), styrene-butadiene copolymers, various synthetic rubber-based resins, phenol resins, epoxy resins, urea resins, melamine resins, phenoxy resins, silicon resins, acrylic resins, and urea formamide resins. Of these, it is preferable to use polyurethane, polyester, vinyl chloride-based copolymers, polyvinyl butyral, and nitrocellulose.

The configuration of the scintillator panel is not particularly limited as long as it includes the scintillator layer, but a scintillator support substrate may be provided. The support substrate is used as a base of the phosphor that forms the scintillator layer and serves to maintain the structure of the scintillator layer. Incidentally, there is a case where the support substrate is not necessarily provided.

Examples of a material of the support substrate include films, sheets, and plates made of various kinds of glasses, polymers, metals, and the like that allow a radiation such as X rays to pass therethrough. Specific examples of a raw material of the support substrate include plate glasses such as quartz, borosilicate glass, and chemically reinforced glasses; amorphous carbon plates; plate-shaped ceramics such as sapphire, silicon nitride, and silicon carbide; semiconductor plates molded from silicon, germanium, gallium arsenide, gallium phosphide, gallium nitride, and the like; polymer films (plastic films) such as cellulose acetate films, polyester resin films, polyethylene terephthalate films, polyamide films, polyimide films, triacetate films, and polycarbonate films, and polymer sheets (plastic sheets) such as carbon fiber-reinforced resin sheets; metal sheets such as aluminum sheets, iron sheets, copper sheets, and lead sheets, or metal sheets having coat layers made of oxides of the metals; and bio-nanofiber films. The support substrate may be formed by one layer of any of the above raw materials or may be formed by the same or different kinds of two or more layers of any of the above raw materials.

The scintillator layer may be formed on the support substrate or may be provided on the surface of the light receiving element or the like that constitutes the photoelectric conversion panel.

Photoelectric Conversion Panel

The photoelectric conversion panel used in the present invention serves to convert tight into an electric signal and to output the electric signal to the outside, and a flexible photoelectric conversion panel is used.

Herein, the configuration of the photoelectric conversion panel used in the present invention is not particularly limited, but the photoelectric conversion panel typically includes a support substrate, a light receiving element, and a switching element, and has the form in which the elements are laminated on the support substrate. These elements have functions of absorbing light produced in the scintillator layer and converting the light into the form of charges. Herein, these elements may have any specific structures as long as they function as such. For example, the light receiving element can be configured to include a transparent electrode, a charge generation layer that generates charges by being excited by incident light, and a counter electrode. As for all of these transparent electrode, charge generation layer, and counter electrode, conventionally known ones can be used, and these are preferably formed by glass plates or resin films as main components.

Further, the light receiving element used in the present invention may be formed by an appropriate photo sensor. For example, the light receiving element may be formed by a plurality of two-dimensionally arranged photodiodes or formed by a two-dimensional photo sensor such as a charge coupled device (CCD) or a complementary metal-oxide-semiconductor (CMOS) sensor.

The switching element has functions of accumulating the charges obtained in the light receiving element and outputting signals based on the accumulated charges. Herein, the switching element may have any specific structures. For example, the switching element can be configured to include a capacitor as a charge accumulation element that accumulates the charges generated in the photoelectric conversion element with respect to each pixel and a transistor as an image signal output element that outputs the accumulated charges in the form of signals. Herein, a preferred example of the transistor is a thin film transistor (TFT).

Figure 6:
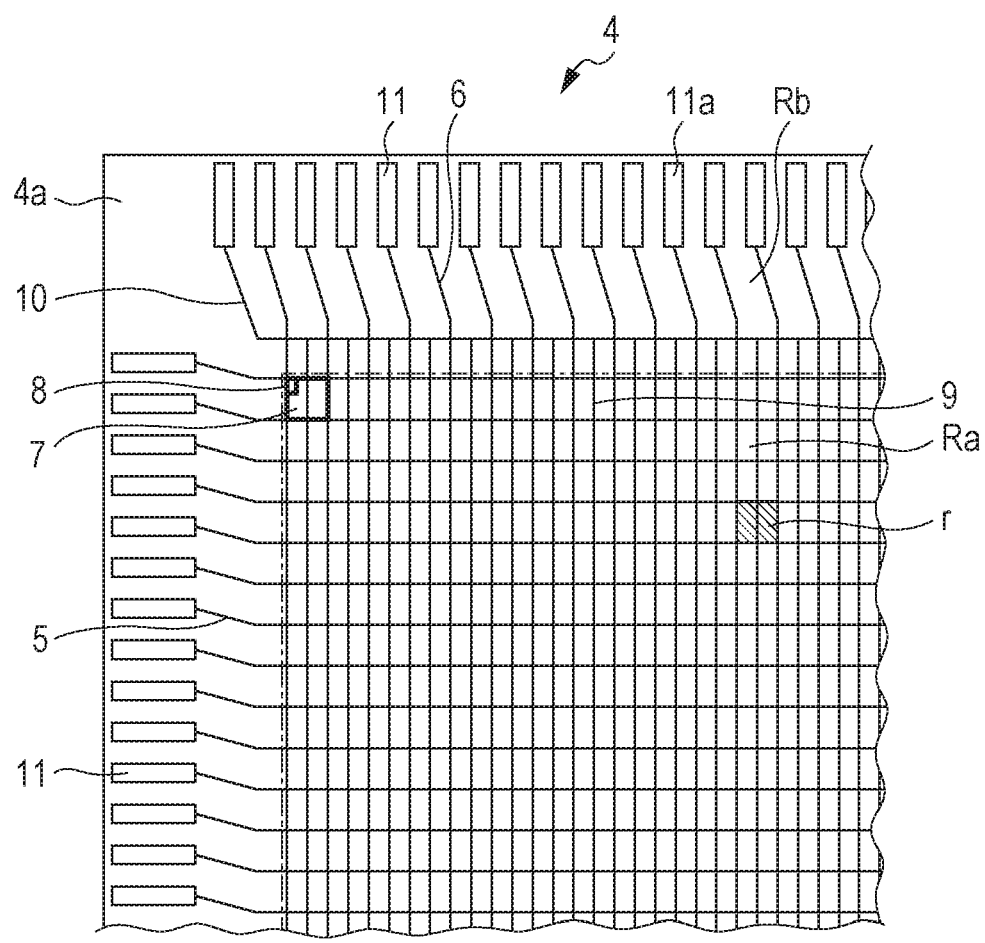
FIG. 6 is a schematic diagram of a photoelectric conversion panel.

The outline of the photoelectric conversion panel is illustrated in FIG. 6. As illustrated in FIG. 6, a plurality of scanning lines 5 and a plurality of signal lines 6 are disposed on a face (hereinafter, referred to the surface) 4a, which faces the scintillator substrate, of a TFT substrate 4 to intersect to each other. Further, a photodiode 7 serving as the light receiving element for detecting a radiation is provided in each small region r partitioned by the plurality of scanning lines 5 and the plurality of signal lines 6.

Among regions on the surface 4a of the TFT substrate 4, a region configured by arranging a plurality of photodiodes 7 on the TFT substrate 4 in a two-dimensional form (matrix form) (that is, a region surrounded by the one-dotted chain line in FIG. 6) forms a pixel region Ra, and a region, other than the pixel region Ra, on the TFT substrate 4 around the pixel region Ra (that is, a region outside the one-dotted chain line in FIG. 6) forms a peripheral region Rb.

Figure 7:
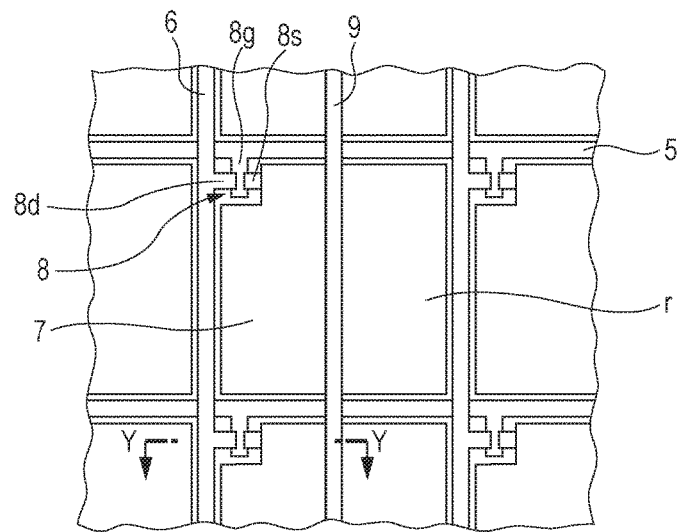
FIG. 7 is an enlarged view of FIG. 6.

The photodiode 7 is used as the light receiving element. In addition, for example, a phototransistor or the like can also be used. Each photodiode 7 is connected to a source electrode 8s, which serves as the switching element, of a TFT 8 as illustrated in FIG. 6 and FIG. 7 that is an enlarged view of FIG. 6. Further, a drain electrode 8d of the TFT 8 is connected to the signal line 6.

The photodiode 7 generates electron-hole pairs inside thereof when a radiation is incident and light converted from the radiation by the scintillator substrate, such as visible light, is emitted. The photodiode 7 converts the emitted visible light into charges in this way.

Then, the TFT 8 is turned on when ON-state voltage is applied to a gate electrode 8g. Consequently, the TFT 8 discharges the charges accumulated in the photodiode 7 to the signal line 6 via the source electrode 8s and the drain electrode 8d. Further, the TFT 8 is turned off when OFFsuite voltage is applied to the gate electrode 8*g* via the scanning line 5. Consequently, the TFT 8 stops discharging of the charges to the signal line 6 from the photodiode 7 and accumulates the charges in the photodiode 7.

That is, charges depending on visible light converted from X rays are generated in the PD and accumulated in the TFT OFF state, and then the TFT is turned on to output the accumulated charges to an external circuit via the signal line 6. This makes it possible to convert X rays into image information and electric information.

Figure 8:
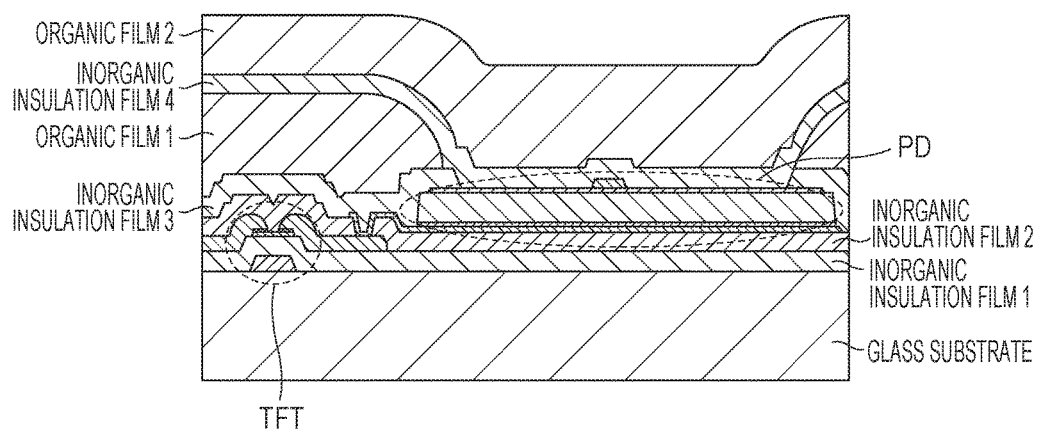
FIG. 8 is a cross-sectional view of a pixel in FIG. 7 cross-sectional view taken along Y-Y)

A cross-sectional view of a pixel (cross-sectional view taken along Y-Y) in FIG. 7 is illustrated in FIG. 8. Herein, the TFT substrate is formed by glass, the aforementioned TFT and PD are laminated on the TFT substrate, and in addition, an insulator is appropriately laminated thereon.

Figure 9:
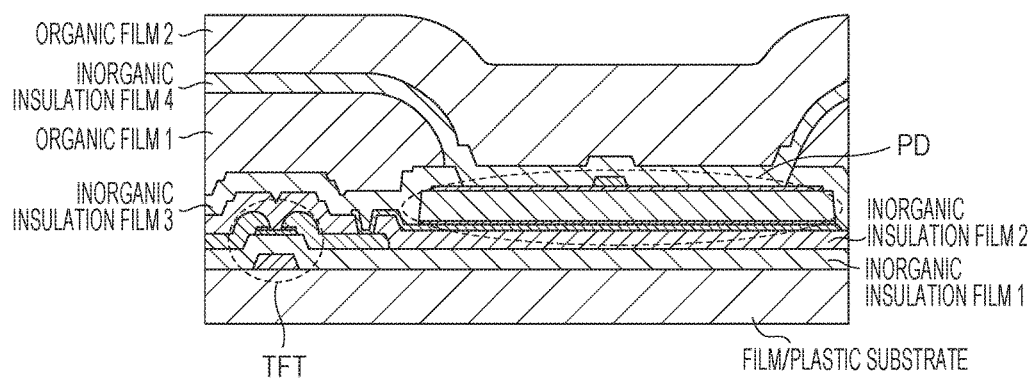
FIG. 9 is a cross-sectional view of a pixel of a flexible TFT.

A cross-sectional view of a pixel of the flexible TFT is illustrated in FIG. 9. A flexible film or plastic substrate is used as the support substrate in FIG. 9.

Figure 10:
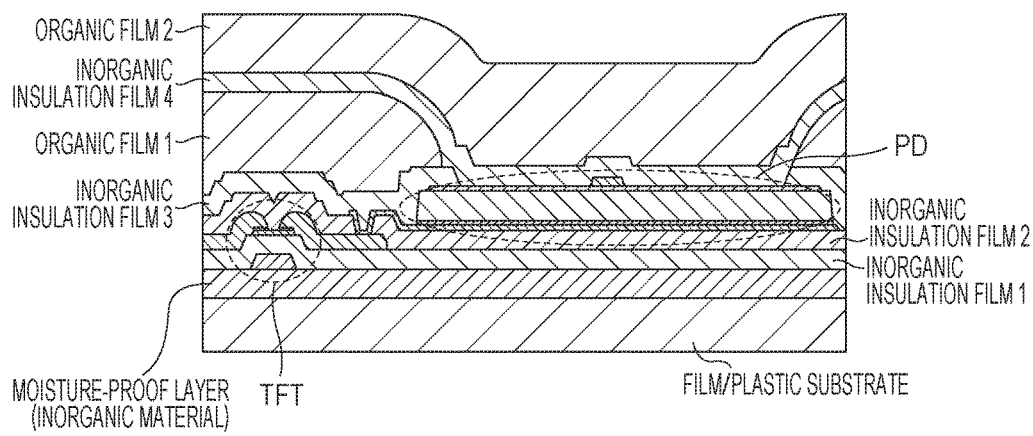
FIG. 10 is another cross-sectional view of a pixel of the flexible TFT.

Another example of a cross-sectional view of a pixel of the flexible TFT is illustrated in FIG. 10. After a layer having moisture-proof property is formed on a flexible film or plastic substrate, the aforementioned TFT and PD are laminated on the layer, and in addition, an insulator is appropriately laminated thereon.

Production processes of the flexible TFT are illustrated in FIG. 11. While the TFT and the PD are formed directly on the glass substrate in the case of the glass substrate TFT, production of the flexible TFT is realized through the flow of:
producing a TFT and a PD after a film material is applied to a glass substrate surface;
peeling the film off from the glass after the TFT and the PD are produced; and
pasting a support substrate such as a plastic substrate as necessary.

Further, as another embodiment, production of the flexible TFT may also be realized through the flow of:
applying a film material to a glass substrate surface;
producing a TFT and a PD after a moisture-proof layer is formed on the film;
peeling the film off from the glass after the TFT and the PD are produced; and
pasting a support substrate such as a plastic substrate as necessary.

In this way, various configurations can be used for elements forming the photoelectric conversion panel used in the present invention. For example, elements obtained by forming a plurality of photodiodes and a plurality of TFT elements on the support substrate can be used.

Further, the support substrate functions as the support substrate of the photoelectric conversion panel, and various glasses, polymer materials, metals, and the like can be used for the support substrate. One kind of these may be used alone or these may be laminated and then used. As such a support substrate, materials similar to the materials of the substrate forming the scintillator panel can be exemplified. In order for the photoelectric conversion panel to have flexibility, the support substrate is preferably a film or sheet having flexibility and a thickness of 50 to 500 µm or an organic-inorganic composite material obtained by coating thin-layer glass with a resin.

Herein, the expression "having flexibility" means "being flexible" where an elastic modulus thereof at 120° C. (E120) is 0.1 to 300 GPa, for reference. Further, the term "elastic modulus" is a value obtained as an inclination of a stress with respect to an amount of strain in a region indicating a linear relationship between a strain indicated by a marked line for a sample based on JIS-C2318 and a stress corresponding thereto, by using a tensile tester. This is a value referred to as Young's modulus, which is defined as the elastic modulus.

The elastic modulus at 120° C. (E120) of the support substrate is preferably 0.1 to 300 GPa and more preferably 1 to 1.00 GPa.

As a raw material of the support substrate having flexibility; among the above-described raw materials, particularly, polymer films and polymer sheets having flexibility and a thickness of 50 to 500 µm are preferable. Specific examples of the polymer films having flexibility include polyethylene naphthalate films (E120=7 GPa), polyethylene terephthalate films (E120=4 GPa), polycarbonate films (E120=2 GPa), polyimide films (E120=7 GPa), polyether imide films (E120=3 GPa, aramid films (E120=12 GPa), polysulfone films (E120=2 GPa), polyether sulfone films (E120=2 GPa), and bio-nanofiber films. Incidentally, the value of elastic modulus may vary even among the same kinds of polymer films and is therefore not necessarily the same as those in the parentheses. Each of the values in the parentheses is one example for reference.

The support substrate my be provided with light absorbing properties and light reflecting properties, for example, by coloring in order to adjust a reflectance. In other words, the support substrate may have also a function of serving as a reflecting layer. Examples of such a support substrate include white PET and black PET in which a white pigment or carbon black is kneaded in the support substrate.

Radiation Detector

The radiation detector of the present invention includes the scintillator panel and the photoelectric conversion panel. In the photoelectric conversion panel, the light receiving element and the switching element face the scintillator layer.

Further, in the radiation detector according to the present invention, the scintillator layer is sealed with a moisture-proof material. The basic configuration of such a radiation detector of the present invention is illustrated in FIG. 1. In FIG. 1, the scintillator support substrate is illustrated, but the scintillator support substrate is not necessarily provided in the present invention.

The moisture-proof material serves to prevent the scintillator panel from moisture and to suppress the deterioration of the scintillator layer. Examples of such deterioration include deterioration of the scintillator layer due to deliquescence of the phosphor that occurs in a case where the phosphor of the scintillator layer is deliquescent. For this reason, the moisture-proof material may prevent the entire scintillator panel from moisture, may prevent the photoelectric conversion panel and the scintillator panel from moisture, or may prevent all of the scintillator panel, the light receiving element, and the switching element from moisture.

The moisture-proof material is preferably formed from a material having a moisture permeability of 1.0 g/m²·day or less, more preferably formed from a material having a moisture permeability of 0.1 g/m²·day or less, and further preferably formed from a material having a moisture permeability of 0.01 g/m²·day or less, from the viewpoint of preventing, the deterioration of the scintillator layer.

Herein, the moisture permeability of the moisture-proof material can be measured according to the method defined by JIS Z 0208, as described below. A film formed from a moisture-proof material is provided in a specified container. Then, while the temperature in the container is maintained at 40° C., a space on one side of the film as a boundary surface is maintained at 90% RH (relative humidity) and a space on the other side thereof is maintained in a dry state by a desiccant. The mass (g) of moisture that passes through the film formed from the moisture-proof material for 24 hours in this state (the protection film is converted to 1 mm$^2$·day) is defined as the moisture permeability.

The moisture-proof material includes a material having low moisture permeability, and examples thereof include polyester such as paraxylylene or polyethylene terephthalate, polymethacrylate, nitrocellulose, cellulose acetate, polypropylene, and polyethylene naphthalate.

From the viewpoint of improving the moisture-proof property of the moisture-proof material, there may be employed a laminated film or a laminated membrane in which a plurality of protection films or vapor-deposited films obtained by vapor depositing a metal oxide or the like are laminated, or an organic-inorganic composite film in which a metal foil such as Al or Cu and a resin film or an ultrathin film glass and a resin film are laminated. For example, as such a laminated film or a laminated membrane, a configuration in which a metal oxide, a metal or the like is vapor deposited or a plurality of vapor-deposited films are laminated on a polyethylene naphthalate film or a polyethylene terephthalate film can be also employed. Examples of the metal oxide include silicon dioxide ($SiO_2$), aluminum oxide ($Al_2O_3$), and ITO.

In a case where a moisture-resistant film is formed by polyparaxylylene, the support substrate or panel with a target scintillator layer formed thereon is placed in a vapor deposition chamber of a CVD apparatus and left exposed in vapor in which diparaxylylene is sublimed, thereby obtaining a radiation detector whose entire surface is covered with a polyparaxylylene film.

The moisture-proof material may include a heat seal material containing a resin having heat seal properties. The resin having heat seal properties is not particularly limited as long as it is a resin that can be fused by a generally used impulse sealer. Examples thereof include ethylene-vinyl acetate copolymers (EVA), polypropylene (PP), and polyethylene (PE). A hot-melt resin can also be employed, and a hot-melt resin containing a polyolefin-based, polyester-based, or polyamide-based resin as a main component is suitable. However, the hot-melt resin is not limited thereto. The hot-melt resin can also be used for adhesion of the scintillator panel with the photoelectric conversion panel.

The hot-melt resin described in the present invention is an adhesive resin which does not contain water or a solvent, is in the form of solid at room temperature, and is formed by a non-volatile thermoplastic material. The hot-melt resin is melted when the temperature of the resin is increased, and the hot-melt resin is solidified when the temperature of the resin is decreased. Further, the hot-melt resin has adhesiveness in the state of being heated and melted and is in the solid state at room temperature so that the hot-melt resin does not have adhesiveness. From the viewpoint of light transmissive property, a polyolefin-based resin is more preferable.

Furthermore, as the moisture-proof material, a metal such as lead or stainless steel and an inorganic material such as silicon nitride, silicon oxynitride, or silicon oxynitric carbide can also be used. For example, in the case of a metal, methods such as vapor deposition and plating can be employed and a sheet-shaped metal can be used. Further, in the case of an inorganic material, known methods such as CVD can be employed.

The thickness of a protection layer formed from a moisture-proof material is not particularly limited as long as the protection layer has a moisture-proof function, but is preferably 10 to 100 μm.

The following embodiments of the radiation detector of the present invention are exemplified depending on the configuration of the radiation detector.

First Embodiment

A radiation detector according to a first embodiment of the present invention is illustrated in FIGS. 2A to 2G.

Figure 2A:
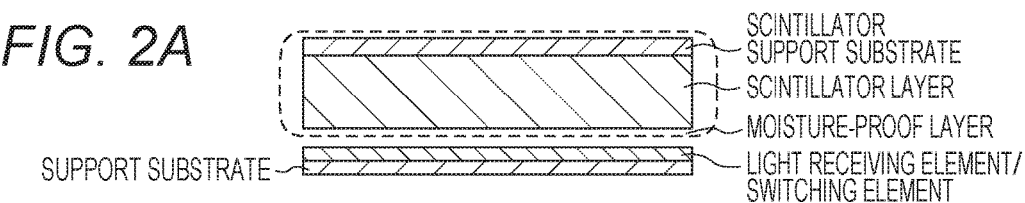
FIGS. 2A to 2G are schematic cross-sectional views illustrating a radiation detector according to a first embodiment of the present invention.

As illustrated in FIG. 2A, in the first embodiment, a moisture-proof layer formed from the moisture-proof material includes a moisture-proof layer (A) on the surface of a scintillator panel and a moisture-proof layer (B) covering the scintillator panel on the surface facing the radiation detector.

Figure 2B:
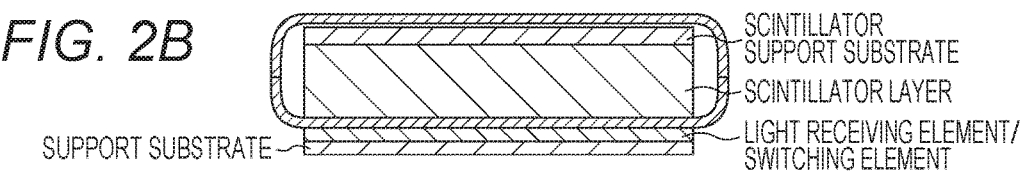

As illustrated in FIG. 2B, there is mentioned an embodiment in which the moisture-proof layer (A) and the moisture-proof layer (B) are integrally formed to cover the outer periphery of the scintillator panel. By depositing paraxylylene or the like to the scintillator panel surface, such an integrally-formed moisture-proof layer can be formed.

Figure 2C:
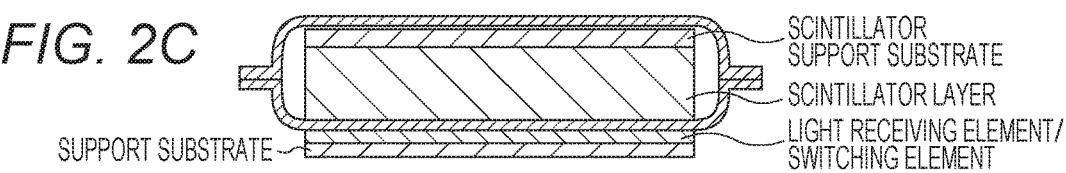

As illustrated in FIG. 2C, there is also mentioned an embodiment in which the moisture-proof layer (A) and the moisture-proof layer (B) are joined at the lateral side end portion of the scintillator panel. In this case, in the moisture-proof layer, it is possible to use, as a barrier film, LDPE and LLDPE made by use of EVA, PP, LDPE, LLDPE, and a metallocene catalyst in the innermost layer for joining end portions, and a thermoplastic resin made by mixed use of these films and an HDPE film, a commercially available thermoplastic resin sheet containing a polyolefin-based, polyamide-based, polyester-based, polyurethane-based, or acryl-based resin as a main component, and an inorganic film mainly having a moisture-proof function, depositing or providing, as a foil, $Cr_2O_3$, $Si_xO_y$ (x–1, y=1.5 to 2.0), $Ta_2O_3$, ZrN, SiC, TiC, PSG, $Si_3N_4$, single crystal Si, amorphous Si, W, a aluminum, $Al_2O_3$, or the like; and to use, as a base material, a film material generally used in a packaging film such as ethylene tetrafluoroethyl copolymer (ETFE), high density polyethylene (HDPE), oriented polypropylene (OPP), polystyrene (PS), polymethylmethacrylate (PMMA), biaxially oriented nylon 6, polyethylene terephthalate (PET), polycarbonate (PC), polyimide, or polyether styrene (PES). Joining is performed at the periphery portion of the scintillator panel by the aforementioned hot-melt resin, or barrier films are thermally compressed. Joining may be performed such that one moisture-proof layer is used as a bottom material or a cover material and the other moisture-proof layer is used as a case material to cover the entire.

Furthermore, the lateral side may be covered with the moisture-proof layer together with the surface and the facing surface of the scintillator panel. As for the covering of the lateral side, the above-described moisture-proof protection film is exemplified, and may be formed by the same material as the material covering the surface or a different appropriate resin. Examples of a different resin covering the lateral side include a polyester resin, a silicone resin, a urethane resin, an epoxy resin, an acrylic resin, and a fluororesin. Herein, when the lateral side is covered, by using a material obtained by further mixing a polyisocyanate curing agent with these resins, strength and adhesiveness with a hard coat film can be improved. Further, one kind of these resins may be used alone or two or more kinds thereof may be used as a mixture.

Figure 2D:
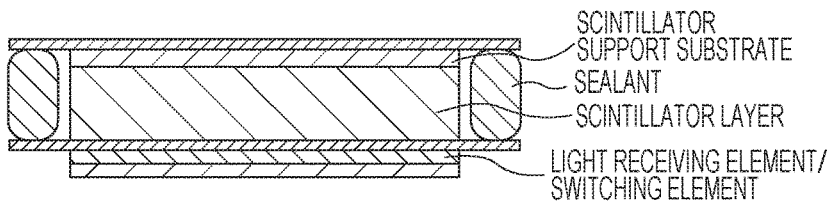

Furthermore, as illustrated in FIG. 2D, there is also mentioned an embodiment in which the radiation detector includes the moisture-proof layer (A), the moisture-proof layer (B), and a sealant layer on the lateral side end portion of the scintillator panel. The lateral sides of the moisture-proof layer (A) and the moisture-proof layer (B) may be sealed by a resin sealant). In this case, a barrier film is used in the moisture-proof layer and a sealant is used for sealing the periphery. As the sealant, for example, an acryl-based, epoxy-based, or silicon-based resin of thermosetting type or ultraviolet curable type can be used. As a rubber-based sealant, a block copolymer-based adhesive such as styrene-isoprene-styrene, a synthetic rubber-based adhesive such as polybutadiene or polybutylene, a natural rubber, and the like can be used. As an example of a commercially available rubber-based sealant, one component type RTV rubber KE 420 (manufactured by Shin-Etsu Chemical Co., Ltd.) or the like is suitably used. As a silicon sealant, a peroxide cross-linking type and an addition condensation type may be used alone or as a mixture. Further, the silicon sealant can be mixed with an acryl-based adhesive or a rubber-based adhesive and used. There may be used a sealant having a silicon component as a pendant group at a polymeric main chain or side chain of an acryl-based sealant. In a case where an acrylic resin is used as a sealant, it is preferable to use a resin obtained by allowing a radical-polymerizable monomer containing an acrylic acid ester having an alkyl side chain with 1 to 14 carbon atoms as a monomer component to react. Further, it is preferable to add, as a monomer component, an acrylic acid ester having a polar group, such as a hydroxyl group, a carboxyl group, or an amino group, at the side chain, or other vinyl-based monomers. Furthermore, as a sealant, a viscous optical grease can also be used. There is usable any commonly known one which is highly transparent and viscous. As an example of a commercially available optical grease, silicone oil KF 96H (Million CS, manufactured by Shin-Etsu Chemical Co., Ltd.) or the like is suitably used.

Figure 2E:
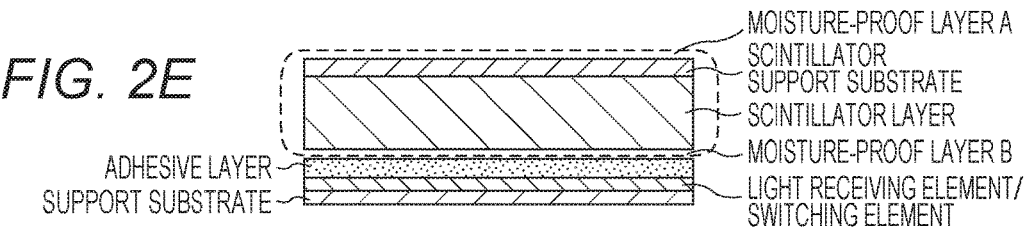

Furthermore, the scintillator panel is preferably pasted to the light receiving element and the switching element via an adhesive layer, and for example, as illustrated in FIG. 2E, the moisture-proof layer (B) may be pasted to the light receiving element and the switching element by the adhesive layer. When the thin-layer photoelectric conversion panel of the resin substrate and the scintillator panel are assembled, warpage occurs more easily and peeling-off occurs easily as compared to the case of using a glass substrate or the like, but by providing the adhesive layer, these problems are solved.

As a material forming the adhesive layer, for example, it is preferable to use a hot-melt sheet, a pressure-sensitive adhesive sheet, and the like. Herein, the hot-melt sheet refers to one which does not contain water or a solvent, is in the form of solid at room temperature, and is formed by molding an adhesive resin (hot-melt resin), which is formed from a non-volatile thermoplastic material, in a sheet shape. The hot-melt sheet is inserted between adherends, and then is melt at a temperature equal to or higher than the melting point and solidified again at a temperature equal to or lower than the melting point so that the adherends can be joined.

Since deliquescence of the scintillator layer does not occur even when the hot-melt sheet is brought into contact with the scintillator layer, which is deliquescent, such as a scintillator layer formed from CsI (Tl), the hot-melt sheet is suitable for joining of the scintillator panel and the photoelectric conversion panel. Further, the hot-melt sheet contains no residual volatile material or the like, and even when the hot-melt sheet is dried after joining the scintillator panel and the photoelectric conversion panel, the shrinkage of the adhesive layer is small and dimension stability is excellent.

When the scintillator panel and the photoelectric conversion panel are pasted by using a hot-melt sheet, it is necessary that the hot-melt sheet is melt at an appropriate temperature and is not melt in the market environment. Specifically, the melting point of the hot-melt resin that forms the adhesive layer is typically 50 to 150° C., preferably 60 to 120° C., and further preferably 60 to 90° C.

In the hot-melt resin, for example, those containing a polyolefin-based, polyamide-based, polyester-based, polyurethane-based, or acryl-based resin as a main component can be used. Of these, from the viewpoint of light transmissive property, moisture-proof property, and adhesiveness, those containing a polyolefin-based resin as a main component are preferable. As the polyolefin-based resin, for example, an ethylene-vinyl acetate copolymer (EVA), an ethylene-acrylic acid copolymer (EAA), an ethylene-acrylic acid ester copolymer (EMA), an ethylene-methacrylic acid copolymer (EMAA), an ethylene-methacrylic acid ester copolymer (EMMA), an ionomer resin, and the like can be used. By adjusting the monomer ratio of the copolymer, the melting point of the resin can be arbitrarily adjusted. For example, in the case of an EVA-based hot-melt resin, by adjusting the weight ratio of vinyl acetate to 1% to 40%, the melting point can be adjusted to 110° C. to 60° C. Incidentally, these resins may be used as a so-called polymer blend obtained by combining two or more kinds thereof.

The adhesive layer may be a layer formed by a hot-melt sheet containing one hot-melt resin or two or more hot-melt resins each having a different melting point, or may be a laminate of two or more hot-melt sheets, the two or more layers being formed by hot-melt resins each having a different melting point.

The hot-melt sheet may be formed by applying a hot-melt resin which has been melt with a die coater or the like, or a commercially available hot-melt sheet may be used.

A pressure-sensitive adhesive sheet may be used in the adhesive layer. As a pressure-sensitive adhesive sheet that can be used in the adhesive layer of the present invention, for example, a so-called double-sided adhesive tape to which a pressure-sensitive adhesive is applied is mentioned. Examples of the pressure-sensitive adhesive include those containing an acryl-based, urethane-based, rubber-based, or silicone-based resin as a main component. Of these, from the viewpoint of light transmissive property and adhesiveness, those containing an acryl-based or silicone-based resin as a main component are preferable. Examples of a commercially available double-sided adhesive tape include No. 5601, No. 5603, No. 5605, and the like manufactured by Nitto Denko Corporation, No. 7027, No. 7029, and the like manufactured by TERAOKA SEISAKUSHO CO., LTD., and #5402, #5402A, #5405, #5405A, and the like manufactured by SEKISUI CHEMICAL CO., LTD.

The refractive index of the adhesive layer can be adjusted, as necessary, to a desired value by adding particles or the like. In general, the refractive index of the adhesive layer is smaller than that of the scintillator in many cases, and for adjustment of the refractive index, it is desirable to add fine particles having a high refractive index to the adhesive layer. For example, alumina, yttrium oxide, zirconium oxide, titanium dioxide, barium sulfate, silica, zinc oxide, calcium carbonate, glasses, resins, and the like can be exemplified. One kind of these may be used alone or two or more kinds thereof may be used in combination. Among the above-described particles, titanium dioxide having a high refractive index is particularly preferable. As the titanium dioxide, titanium dioxides having any crystalline structure of a rutile type, a brookite type, and an anatase type may be used, but from the viewpoint that it has a large ratio of refractive index with respect to the resin and high brightness can be achieved and the viewpoint of the reflectance of visible light, a rutile type is particularly preferable. The area average particle diameter of the particles is preferably 1 to 50 nm and further preferably 1 to 20 nm in order not to significantly impair the transparency of the adhesive layer. The particles are contained to have preferably an amount of 3 to 30% by volume and further preferably an amount of 5 to 20% by volume when all of the materials forming the adhesive layer are regarded to 100% by volume. When the particles are contained in such a range, the refractive index can be improved without significantly impairing the transparency of the adhesive layer.

The thickness of the adhesive layer is typically 1 to 100 μm, preferably 1 to 30 μm, and more preferably 3 to 20 μm. When the lower limit of the thickness is set to the above ranges, adhesiveness between the scintillator panel and the photoelectric conversion panel can be ensured. Further, when the upper limit of the thickness is suppressed to the above ranges, diffusion of light emitted from the scintillator layer in the inside of adhesive layer is suppressed so that an image with high sharpness can be obtained.

Figure 2F:

Further, as illustrated in FIG. 2F, there is also mentioned an embodiment in which the moisture-proof layer (A) is pasted to the scintillator panel via an adhesive layer. As the adhesive layer used at this time, the above-described examples are mentioned. Peeling-off, warpage, or unevenness caused by accumulation of static electricity in the inside in the market environment occurs when assembling is performed from a thin layer or a resin substrate, but by fixing the moisture-proof layer (A), these problems are solved.

Figure 2G:

Furthermore, as illustrated in FIG. 2G, at least one or both of the moisture-proof layer (A) and the moisture-proof layer (B) may have an electrically conducting function. With providing an electrically conducting function, it is possible to dissipate static electricity to the inside in the market environment so that unevenness caused by static electricity can be solved.

Providing an electrically conducting function can be achieved by allowing an antistatic agent to be contained in the moisture-proof material, and an electrically conductive layer can be provided on the moisture-proof material surface. Examples of the antistatic agent may include carbon particles (carbon black, graphite, carbon fiber, and carbon nanotube), oxide semiconductor particles (zinc oxide-based, tin oxide-based, and indium oxide-based), surfactants (a tetraalkyl ammonium salt, a trialkylbenzylammonium salt, an alkyl sulfonic acid salt, an alkyl phosphate, a glycerin fatty acid ester, and a polyoxyethylene alkyl ether), hydrophilic polymers (a sulfonate, a quaternary ammonium salt, a polyethylene glycol methacrylate copolymer, a polyether ester amide, a polyether amide imide, and a polyethylene oxide-epichlorohydrin copolymer), and electrically conductive polymers (polyacetylene, polypyrrole, polythiophene, polyaniline, poly(3,4-dialkylpyrrol), poly(3,4-ethylenedioxythiophene), and poly(aniline sulfonic acid)).

The electrically conductive layer can be formed by only a material having an antistatic function as described below. Examples of the material include surfactants (a tetraalkyl ammonium salt, a trialkylbenzylammonium salt, an alkyl sulfonic acid salt, an alkyl phosphate, a glycerin fatty acid ester, and a polyoxyethylene alkyl ether), hydrophilic polymers (a sulfonate, a quaternary ammonium salt, a polyethylene glycol methacrylate copolymer, a polyether ester amide, a polyether amide imide, and a polyethylene oxide-epichlorohydrin copolymer), and electrically conductive polymers (polyacetylene, polypyrrole, polythiophene, polyaniline, poly(3,4-dialkylpyrrol), poly(3,4-etlyenedioxythiophene), and poly(aniline sulfonic acid)).

The electrically conductive layer can also be formed by an electrically conductive sheet mixed with metal fine particles, an electrically conductive polymer such as an electrically conductive adhesive, an electrically conductive oxide such as indium tin oxide (ITO) or indium zinc oxide (IZO), or the like. Further, an electrically conductive oxide layer or an electrically conductive metal layer may be formed.

Second Embodiment

A radiation detector according to a second embodiment of the present invention is illustrated in FIGS. 3A to 3E.

Figure 3A:
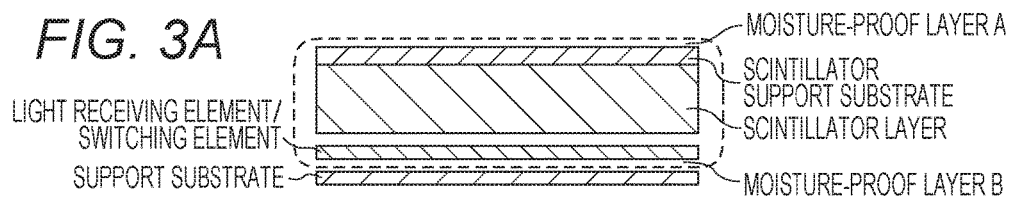
FIGS. 3A to 3E are schematic cross-sectional views illustrating a radiation detector according to a second embodiment of the present invention.

As illustrated in FIG. 3A, in the second embodiment, a moisture-proof material includes a moisture-proof layer (A) on a scintillator panel surface and a moisture-proof layer (B) of a light receiving element and a switching element between the elements and the support substrate.

Figure 3B:
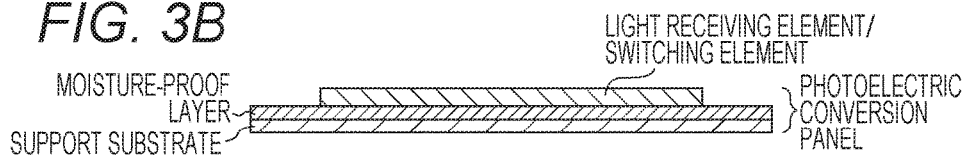

As illustrated in FIG. 3B, there is also mentioned an embodiment in which a photoelectric conversion panel is formed by providing the switching element and the light receiving element on the moisture-proof layer (B) formed on a support substrate. For this reason, the moisture-proof layer (B) is preferably formed from an inorganic material having high insulating property.

Incidentally, the moisture-proof layer (A) can employ the configuration similar to that of the first embodiment.

Figure 3C:
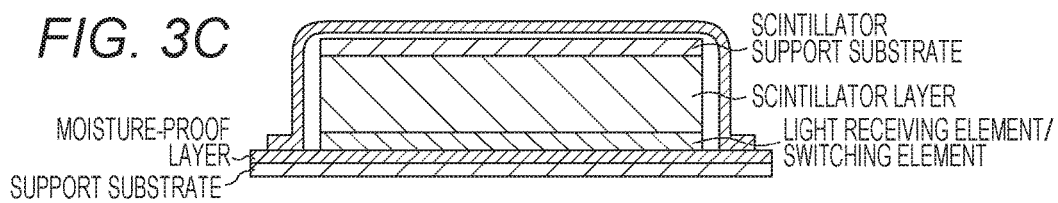

As illustrated in FIG. 3C, there is also mentioned an embodiment in which the moisture-proof layer (A) and the moisture-proof layer (B) are joined at the lateral side end portion of the scintillator panel. In this case, in the moisture-proof layer (A), it is possible to use, as a barrier film, the films described in the first embodiment, but as an example, an organic-inorganic composite film obtained by pasting an Al foil and PET, or the like is used and the periphery portions of the film are joined by a hot-melt resin provided on the innermost layer. Joining may be performed such that one moisture-proof layer is used as a bottom material or a cover material and the other moisture-proof layer is used as a case material to cover the entire.

Furthermore, similarly to the first embodiment, the moisture-proof layer (A) on the surface of the scintillator panel, the moisture-proof layer (B) of the light receiving element and the switching element between the elements and the support substrate, and the lateral sides of the scintillator layer and the elements may be covered with the moisture-proof layer. As for the covering of the lateral side, the above-described moisture-proof protection film is exemplified, and may be formed by the same material as the material covering the surface or a different appropriate resin, similarly to the first embodiment. Examples of a different resin covering the lateral side include a polyester resin, a silicone resin, a urethane resin, an epoxy resin, an acrylic resin, and a fluororesin. Herein, when the lateral side is covered, by using a material obtained by further mixing a polyisocyanate curing agent with these resins, strength and adhesiveness with a hard coat film can be improved. Further, one kind of these resins may be used alone or two or more kinds thereof may be used as a mixture.

Figure 3D:
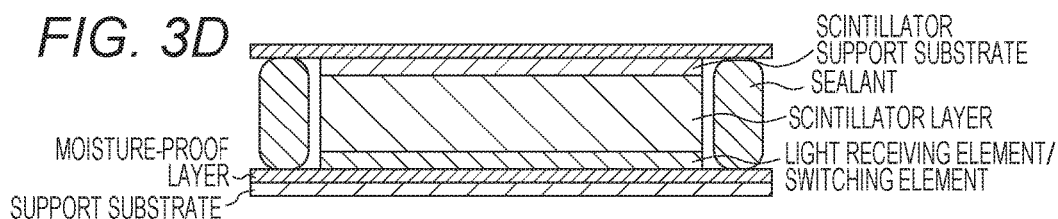

Furthermore, as illustrated in FIG. 3D, there is also mentioned an embodiment in which the radiation detector is formed from the moisture-proof layer (A), the moisture-proof layer (B), and a sealant layer on the lateral side end portion of the scintillator panel. As the sealant, examples similar to those exemplified in the first embodiment can be employed.

Figure 3E:
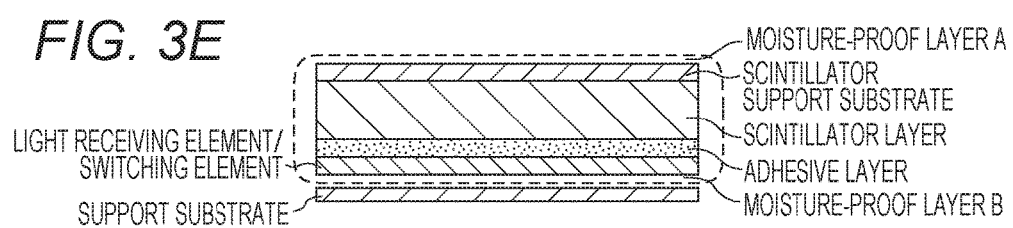

Further, as illustrated in FIG. 3E, the light receiving element and the switching element may be pasted to the scintillator panel via an adhesive layer. When the thin-layer photoelectric conversion panel of the resin substrate and the scintillator panel are assembled, warpage occurs more easily and peeling-off occurs easily as compared to the case of using a glass substrate or the like, but by providing the adhesive layer, these problems are solved.

The material forming the adhesive layer is as described above.

Further, similarly to the first embodiment, there is also mentioned an embodiment in which the moisture-proof layer (A) is pasted to the scintillator panel via an adhesive layer. Furthermore, at least one or both of the moisture-proof layer (A) and the moisture-proof layer (B) may have an electrically conducting function. With providing a electrically conducting function, it is possible to dissipate static electricity to the inside in the market environment so that unevenness caused by static electricity can be solved.

Third Embodiment

A radiation detector according to a third embodiment of the present invention is illustrated in FIGS. 4A to 4D.

Figure 4A:
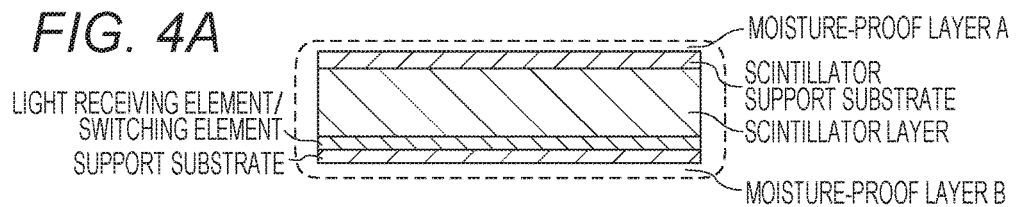
FIGS. 4A to 4D are schematic cross-sectional views illustrating a radiation detector according to a third embodiment of the present invention.

As illustrated in FIG. 4A, in the third embodiment, the radiation detector includes a moisture-proof layer (A) on the surface of the scintillator panel, and a moisture-proof layer (B) on the surface, which is opposite to the scintillator, of the photoelectric conversion panel.

Incidentally, the moisture-proof layer (A) can employ the configuration similar to those of the first and second embodiments.

Figure 4B:
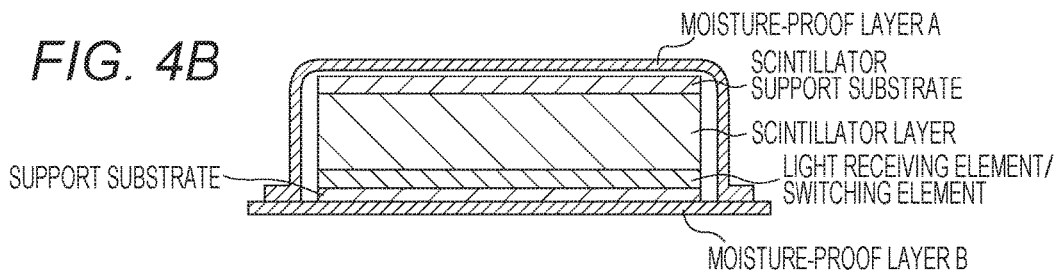

As illustrated in FIG. 4B, there is also mentioned an embodiment in which the moisture-proof layer (A) and the moisture-proof layer (B) are joined at the lateral side end portion of the scintillator panel. In this case, a film described in the first embodiment can be employed as a barrier film in the moisture-proof layer (A). However, as an example, an organic-inorganic composite film obtained by pasting an Al foil and PET, or the like is used and the periphery portions of the film are joined by a hot-melt resin provided on the innermost layer. Joining may be performed such that one moisture-proof layer is used as a bottom material or a cover material and the other moisture-proof layer is used as a case material to cover the entire.

Further, similarly to the first and second embodiments, the moisture-proof layer (A) on the surface of the scintillator panel, the moisture-proof layer (B) on the surface, which is opposite to the scintillator, of the photoelectric conversion panel, and the lateral sides of the scintillator layer and the photoelectric conversion panel may be covered with the moisture-proof layer. As for the covering of the lateral side, the above-described moisture-proof protection film is exemplified, and may be formed by the same material as the material covering the surface or a different appropriate resin, similarly to the first and second embodiments. Examples of a different resin covering the lateral side include a polyester resin, a silicone resin, a urethane resin, an epoxy resin, an acrylic resin, and a fluororesin. Herein, when the lateral side is covered, by using a material obtained by further mixing a polyisocyanate curing agent with these resins, strength and adhesiveness with a hard coat film can be improved. Further, one kind of these resins may be used alone or two or more kinds thereof may be used as a mixture.

Figure 4C:
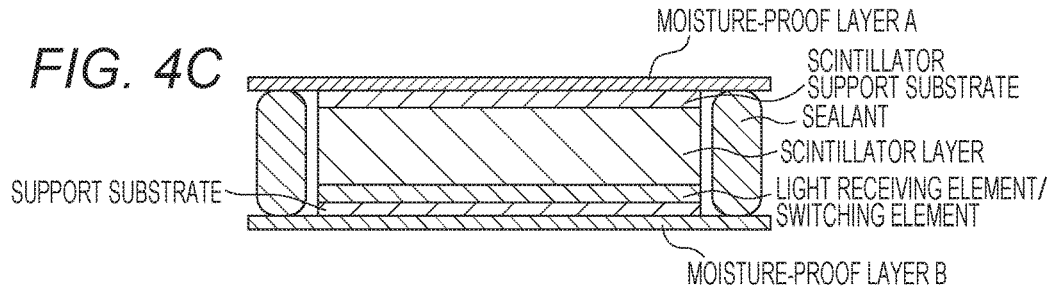

Furthermore, as illustrated in FIG. 4C, there is also mentioned an embodiment in which the radiation detector is formed from the moisture-proof layer (A), the moisture-proof layer (B), and a sealant layer on the lateral side end portion of the scintillator panel. As the sealant, examples similar to those exemplified in the first and second embodiments can be employed.

Figure 4D:
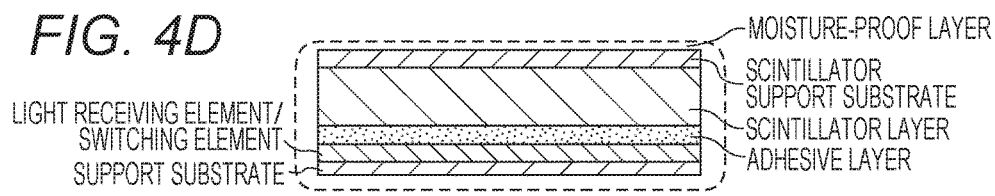

Further, as illustrated in FIG. 4D, the scintillator panel may be pasted to the light receiving element and the switching element on the photoelectric conversion panel via an adhesive layer. When the thin-layer photoelectric conversion panel of the resin substrate and the scintillator panel are assembled, warpage occurs more easily and peeling-off occurs easily as compared to the case of using a glass substrate or the like, but by providing the adhesive layer, these problems are solved.

The material forming the adhesive layer is as described above.

Further, at least one or both of the moisture-proof layer (A) and the moisture-proof layer (B) may have an electrically conducting function. With providing an electrically conducting function, it is possible to dissipate static electricity to the inside in the market environment so that unevenness caused by static electricity can be solved.

Embodiment of Rigid Plate

In the present invention, there is also mentioned an embodiment in which a rigid plate is further provided on the surface, which is opposite to the scintillator, of the photoelectric conversion panel.

A flexible radiation detector formed from a thin-layer resin substrate may be deviated due to impact during using the radiation detector. In this regard, by fixing the radiation detector by the rigid plate, adhesiveness of the member is increased and it is possible to obtain a radiation detector without deviation and defect increasing.

The thickness and the material of the rigid plate are not particularly limited as long as the rigid plate is a plate having an elastic modulus of 10 GPa or more. Metals such as lead, composite materials such as glass, carbon, and CFRP, resin materials such as PET, and the like can be used without particular limitation. Further, the moisture-proof material can also function as the rigid plate.

Joining of the rigid plate to a target object is preferably performed via an adhesive layer. A material used for joining is not particularly limited, but joining is preferably performed via a hot-melt sheet. Well-known hot-melt sheets can be used as the hot-melt sheet. Further, examples of the types of the hot-melt sheet include, depending on a main component thereof, polyolefin-based, polyamide-based, polyester-based, polyurethane-based, and EVA-based sheets. However, the hot-melt sheet is not limited thereto.

The place of the rigid plate used may be an outer surface, an inner surface, or an inside as long as the rigid plate is used as the constituent member of the radiation detector.

Embodiments using the rigid plate are illustrated in FIGS. 5A to 5F.

Figure 5A:
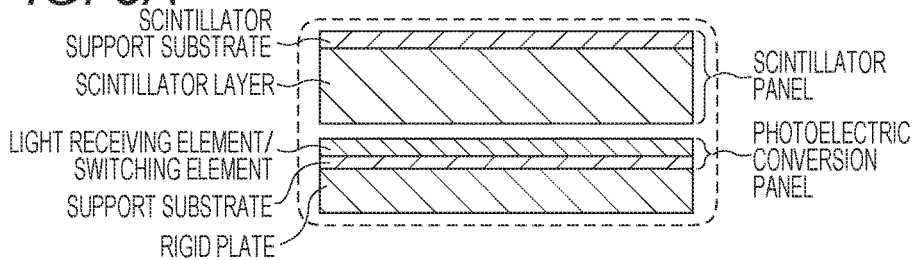
FIGS. 5A to 5F are schematic cross-sectional views illustrating an embodiment using a rigid plate of a radiation detector according to an embodiment of the present invention.

For example, as illustrated in FIG. 5A, there is mentioned an embodiment in which a rigid plate is provided on the surface, which is opposite to the scintillator, of the photoelectric conversion panel.

Figure 5B:
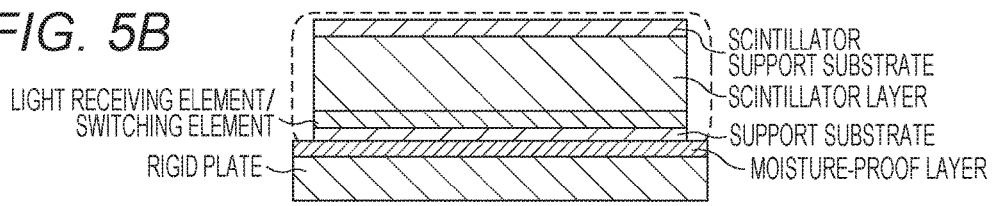
Figure 5C:
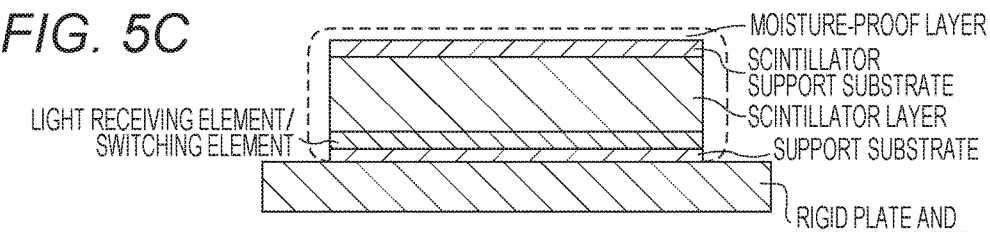

Further, as illustrated in FIG. 5B, the rigid plate may be provided on the surface, which is opposite to the scintillator, of the photoelectric conversion panel and the moisture-proof layer (B) may be formed between the photoelectric conversion panel and the support substrate on the rigid plate. Furthermore, as illustrated in FIG. 5C, the rigid plate may have a function of the moisture-proof layer (B). In a case where the rigid plate has a function of the moisture-proof layer, metal plates formed from metals having an atomic number equal to or higher than 40, such as lead, which is less likely to transmit a radiation are used as the rigid plate, and these also function as the moisture-proof layer.

Figure 5D:
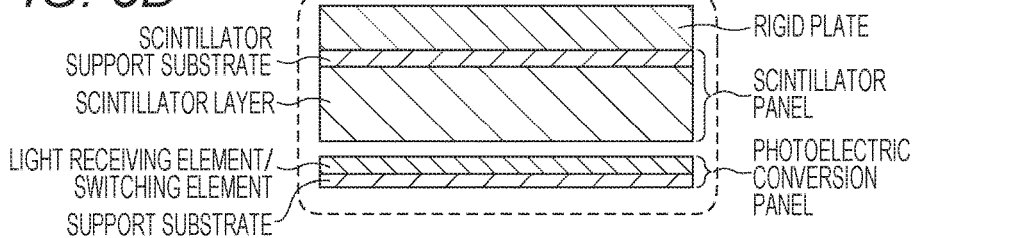

As illustrated in FIG. 5D, the rigid plate may be provided on the scintillator panel surface.

The scintillator panel surface may be a radiation incident side or a photoelectric conversion panel side at a radiation exit side, but desirably, the rigid plate is preferably formed on an outside surface.

Figure 5E:
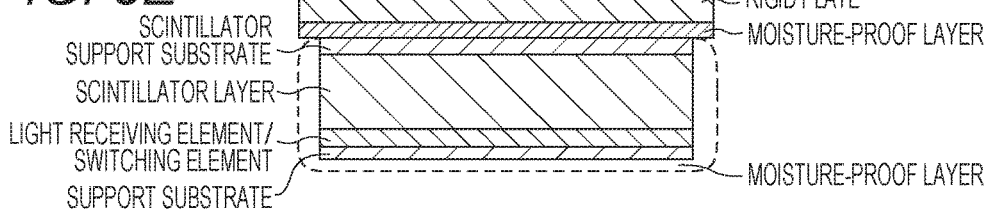

As illustrated in FIG. 5E, there is also mentioned an embodiment in which the moisture-proof layer (A) is formed on the surface of the rigid plate of the scintillator panel surface.

Figure 5F:
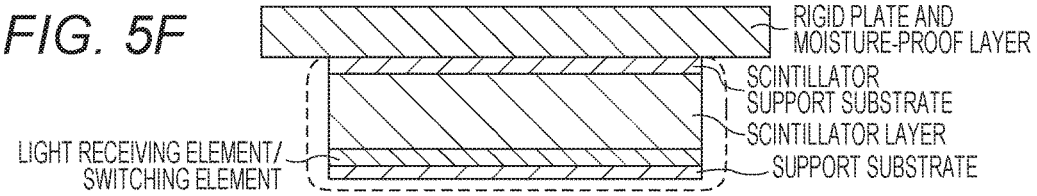

Further, as illustrated in FIG. 5F, the rigid plate may have a function of the moisture-proof layer (A).

The rigid plate may be a top plate of a housing which houses the radiation detector.

Further, in the radiation detector of the present invention, X rays may be emitted from any side. In a case where X rays are emitted from the scintillator panel side, since X-ray use efficiency of the scintillator is improved, light is emitted at higher intensity, and in a case where X rays are emitted from the photoelectric conversion panel side, light is emitted at higher intensity at the scintillator close to the light receiving element. Thus, the resolution of radiation images obtained by photographing is high.

According to an embodiment of the present invention, a radiation detector is provided which can be reduced in thickness and size and in which warpage, peeling-off, and unevenness caused by accumulation of static electricity in the inside thereof do not occur. Such a radiation detector according to an embodiment of the present invention can be applied to various X-ray image photographing systems.

Although embodiments of the present invention have been described and illustrated in detail, the disclosed embodiments are made for purposes of illustration and example only and not limitation. The scope of the present invention should be interpreted by terms of the appended claims.

What is claimed is:

1. A radiation detector comprising:
   a scintillator panel having a scintillator layer; and
   a photoelectric conversion panel having a support substrate, a light receiving element, and a switching element,
   wherein:
   the light receiving element faces the scintillator layer,
   the photoelectric conversion panel has flexibility,
   the scintillator layer is sealed with a moisture-proof material,
   the moisture-proof material includes a first moisture-proof layer and a second moisture-proof layer,
   the first moisture-proof layer is provided on a surface of the scintillator panel which is opposite to a surface of the scintillator panel facing the photoelectric conversion panel, and
   a rigid plate is provided on a surface of the photoelectric conversion panel which is opposite to a surface of the photoelectric conversion panel facing the scintillator panel, the rigid plate functioning as the second moisture-proof layer.

2. The radiation detector according to claim 1, wherein at least one of the first moisture-proof layer and the second moisture-proof layer is an electrically conductive layer.

3. The radiation detector according to claim 1, wherein the rigid plate is a bottom plate of a housing which houses the radiation detector.

4. A radiation detector comprising:
   a scintillator panel having a scintillator layer; and
   a photoelectric conversion panel having a support substrate, a light receiving element, and a switching element,
   wherein:
   the light receiving element faces the scintillator layer,
   the photoelectric conversion panel has flexibility,
   the scintillator layer is sealed with a moisture-proof material,
   the moisture-proof material includes a first moisture-proof layer and a second moisture-proof layer,
   a rigid plate is provided on a surface of the scintillator panel which is opposite to a surface of the scintillator panel facing the photoelectric conversion panel, the rigid plate functioning as the first moisture-proof layer, and
   the second moisture-proof layer is provided on a surface of the photoelectric conversion panel which is opposite to a surface of the photoelectric conversion panel facing the scintillator panel.

5. The radiation detector according to claim 4, wherein at least one of the first moisture-proof layer and the second moisture-proof layer is an electrically conductive layer.

6. The radiation detector according to claim 4, wherein the rigid plate is a top plate of a housing which houses the radiation detector.

* * * * *